May 18, 1943. W. LEATHERS 2,319,411
REGISTER OPERATING MECHANISM
Filed Aug. 2, 1940
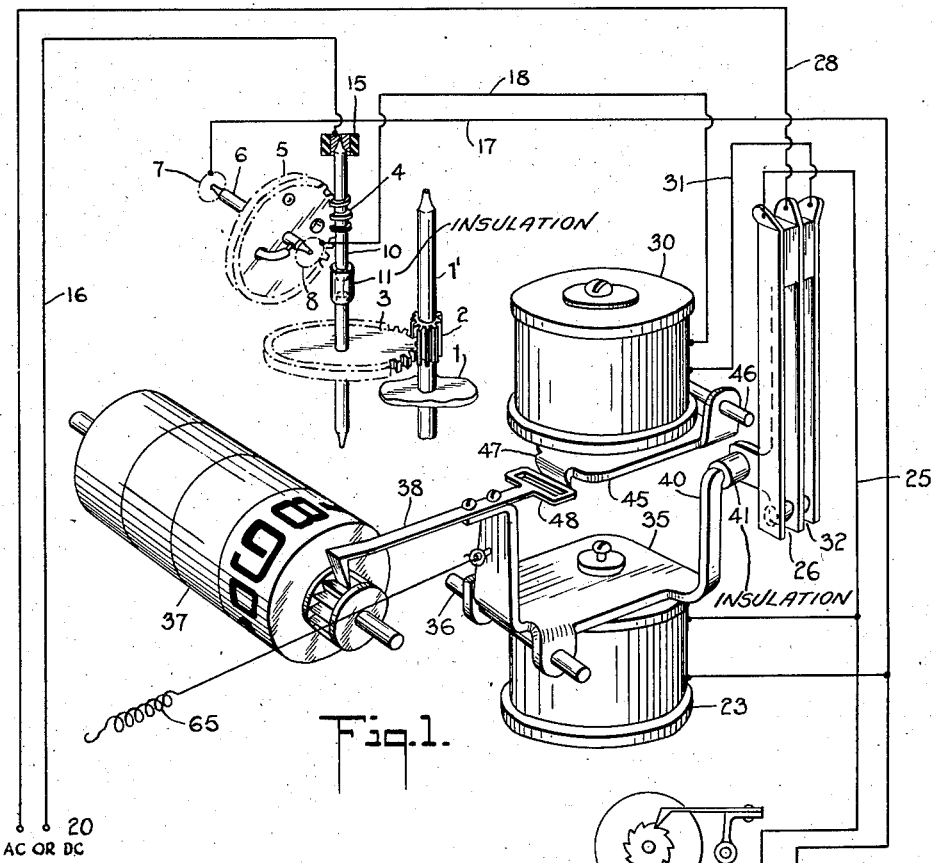
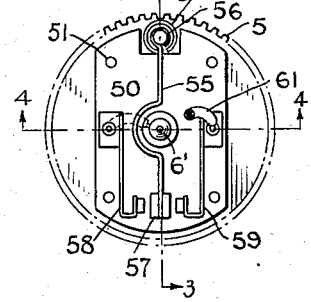
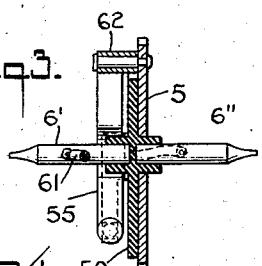
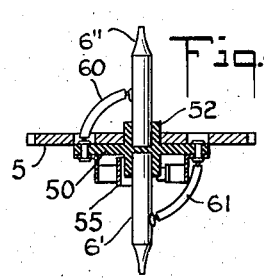
INVENTOR
Ward Leathers Patented May 18, 1943

2,319,411

UNITED STATES PATENT OFFICE 2,319,411

REGISTER OPERATING MECHANISM

Ward Leathers, Brooklyn, N. Y., assignor, by mesne assignments, to International Business Machines Corporation Application August 2, 1940, Serial No. 349,978

3 Claims. (Cl. 235—92)

The present invention relates to electric register operating mechanism, and more particularly to a means whereby the volume or quantity consumption of a metered product may be registered or indicated on a counting mechanism, preferably in the form of a step-by-step cyclometer device.

Heretofore, both barrel and disc type step-by-step counters have been applied to different types of meters but always these devices have created a measure of frictional resistance to the free rotation of the meter armature-disc which has resulted in registering slightly less current than actually consumed. This represents a loss in actual dollars and cents to the public utility corporation distributing electric current and billing to consumer on the basis of such meter reading.

Step-by-step or cyclometer mechanisms require more energy for their actuation than the older type of rotating disc or pointer indicators. These former indicators, however, did not show full digit figures at the several positions of units, tens, hundreds, thousands. They generally turned two discs clockwise and two counter-clockwise and were practically unreadable to the average consumer. Cyclometer registers, as heretofore applied to electric meters, have given step-by-step figures for the digits representing tens, hundreds, thousands but units figures have invariably been turned progressively. The reason for this lies in the fact that such cyclometer registers when applied to electric meters, and driven by the armature-disc of the meter, must be built to function with the smallest mechanical effort. Although such cyclometer registers have been built to operate with extremely small effort they still furnish a measurable resistance to the free indication of the total consumed current.

An object of the present invention in meters of this sort is to provide means whereby units, tens, hundreds, thousands digits are all turned step-by-step.

A further object of the invention is to actuate the indices from an auxiliary power source removing all necessity for the performance of work by the measuring mechanism of the meter.

A further object of the invention is to reduce the actual work-effort on the part of the metering mechanism to a minimum.

In order to make my invention clear and understandable, I have prepared the following specification, to which I have appended a drawing, of which:

Figure 1 is a perspective, diagrammatic view of an arrangement of cyclometer-indicator, electric-contacts, and auxiliary cyclometer-drive.

Figure 2 is an elevational view of the contacting mechanism.

Figure 3 is a sectional view taken substantially along the line 3—3 of Figure 2.

Figure 4 is a sectional view taken substantially along the line 4—4 of Figure 2.

An armature-disc 1 of an electric meter is normally carried on a vertical shaft 1' having integral with it a gear 2 meshing with a larger gear 3. The gears 2 and 3 in some makes of meters are worm and worm-gear instead of the spur and pinion shown. Further speed reduction is obtained from the shaft of the gear 3 by means of a worm 4 and worm-gear 5, or other suitable reduction gear. The gear 5 is mounted on a shaft 6 carried in suitable bearings 7 and 8. The gear 5 also carries structured to it the contacting mechanism which will presently be made clear. The spur gear 3 is supported on a shaft 10 which also bears the worm 4. This shaft is split between the worm and the gear and joined by an insulating sleeve or union 11 whereby electrical insulation is effected between the gear 3 and the worm 4. The worm end of the shaft 10 is supported in an electrically insulated bearing 15 to which one line of a supply current is joined. The bearings for the shaft 6, (which carries the contacting mechanism to be described) are also electrically insulated in similar manner to that of the bearing 15 of shaft 10. These bearings are also provided respectively with electrical conductors 17 and 18. Suitable current from a source 20, in the case of an electric meter consisting of the current supply lines, is supplied through the conductor 16, the bearing 15, the worm 4, the gear 5, the distributing mechanism (Figures 2, 3 and 4) through shaft 6, the insulated bearing 7, the conductor 17 to the coil of an electro-magnet or indexing solenoid 23, thence by a conductor 25 to a pair of normally closed spring contacts 26, and a common return line 28. When the current is diverted through the other insulated bearing, 8, of the shaft 6 it is led by the conductor 18 to the coil of an electro-magnet 30 thence by a conductor 31 to a pair of normally open contacts 32, and the common return line 28. The coil 23, when actuated, by means of an armature 35 journaled at 36 turns or indexes a cyclometer 37 to register one numeral by means of a pawl-and-ratchet 38. Also, by means of a lever 40 having a conventional insulator 41 it breaks its own current at the contacts 26 and establishes contact at 32, in the supply line to the coil 30. The electro-magnet 30, when actuated, by means of an armature 45 journaled at 46 raises a latch 47 designed for engagement with a latch mechanism 48 joined to the armature 35 of the coil 23. The circuit through the contacts 26 is normally established while that at 32 is normally broken when the latch mechanism 47—48 is disengaged; and vice versa, the circuit through the contacts 32 is established and that through the contacts 26 is broken when the latch 47—48 is engaged.

The contacting mechanism above referred to, Figures 2, 3 and 4, comprises an insulating part or plate 50 to which is joined the gear 5 in suitable manner as by rivets 51. This part 50 has a hub-like portion 52 into which two ends of the shaft 6, marked 6' and 6", are inserted and coaxially held but insulated from each other. A free swinging pendulum 55 is joined in a freely hinged manner, as well as electrically, to the gear 5 at 56. The free end of the pendulum 55 is provided with opposed contacts 57 for contact alternately with spring supported contacts 58 and 59 supported in insulated manner on the insulation part 50. Contact 58 is electrically joined by means of a connector 60 to the shaft 6", while the contact 59 is electrically joined by the conductor 61 to the shaft 6'. A sufficient fixed weight 62 is added at the hinged end of the pendulum, but not part thereof, for perfectly balancing this entire pendulum-distributor. It must now be evident that during half a revolution of the gear 5 contact is made and establishing a circuit over the conductor 18 while during the other half revolution same would be true with regard to the conductor 17. Thus a reversal of the circuits is obtained with each half revolution or a full cycle per consumed k. w. h. (or other unit-commodity).

The mechanism operates as follows: When the meter has turned the gear 5 until the pendulum contact 57 makes contact at 59 current through the conductor 17 actuates the coil 23 which instantly breaks its own circuit at 26. Because of the fact that from the moment the contacts 57 and 59 move into electrical contact they will remain in such contact for substantially one-half revolution of the gear 5, a suitable means is required to hold the solenoid circuit open for a predetermined length of time until such half-revolution has been completed. Otherwise chattering of the apparatus would take place and repeated opening and closing of the solenoid circuit would serve to rapidly run the counter mechanism up out of all proportion to consumption of the metered products. Toward this end, upon energization of the solenoid 23 a stepping-up of the cyclometer 37 occurs and the armature 35 of the solenoid becomes latched in its retracted position by virtue of the mechanism 47, 48, thus holding the solenoid circuit open until the gear 5 has completed its half-revolution. The current, therefore, through the coil 23 is only momentary and is in the form of a brief current impulse. When the gear 5 has turned 180° and the pendulum makes contact at 58 current through the conductor 18 actuates the latch releasing solenoid 30 which releases the latch 47—48 thereby breaking its own circuit at 32 because the armature 35 with its arm 40 has been returned to its starting position by a spring 65.

In cases where a secondary recording cyclometer may be required an additional coil 123, armature 135, and indicating unit 137 may be wired parallel with the coil 23. The primary object of this arrangement would be to put the meter containing the gear reduction, contacting mechanism, coils 30 and 23 at a distance from the consumer's premises, as for instance on a telephone pole or in a street well, while the secondary cyclometer 123, 135, 137 may be on consumer's premises as legally required for his reference.

While the embodiment in my invention herewith described has set forth the meter registering armature of an electric meter as the primary source of actuation and the registering of consumed electric current as the primary objective, it is important to note that where the initial source of actuation is in a gas, water or steam meter the gear reduction elements are devised to deliver to the gear 5 one revolution for each unit of consumed commodity. Thus, where an application of this invention is made to other than electric meters a local source of electric current must be provided for its actuation. However, it will then register units of any desired commodity.

What is claimed is:

1. In an apparatus for periodically indexing a rotary counter in accordance with the movements of a rotary member, an operating solenoid having a core movable, upon energization of the solenoid, from an initial position to a final position, means connecting the core and counter for operation of the latter upon movement of the former to its final position, means normally maintaining the core in its initial position, a circuit for said solenoid, a latch for holding said core in its final position, a solenoid for releasing said latch upon energization thereof, a circuit for said latter solenoid, a normally closed pair of contacts in said first mentioned circuit and a normally open pair of contacts in said second mentioned circuit, means operable upon movement of said core from its initial position to its final position to open the normally closed contacts and close the normally open contacts and vice versa, and means operable upon rotation of the rotary member for alternately controlling said circuits.

2. In an apparatus for periodically indexing a rotary counter in accordance with the movements of a rotary member, an indexing solenoid having a core movable, upon energization of the solenoid, from one position to another position, a ratchet mechanism connecting the core and counter for operation of the latter upon movement of the core, means normally maintaining the core in one of said positions, a circuit for the solenoid, latching means for holding said core in its other position, a solenoid for releasing said latching means upon energization thereof, a circuit for said latter solenoid, a normally closed pair of contacts controlled by said indexing solenoid and in the circuit of the latter and a normally open pair of contacts in the circuit of the latch-releasing solenoid, means operable upon movement of said core from its normal position to its other position for opening the normally closed contacts and for closing the normally open contacts and vice versa, and means operable upon rotation of the rotary member for alternately energizing said circuits.

3. In an electrical take-off for rotary meter shafts, a counter, an indexing solenoid having a core movable upon energization of the solenoid from an initial position to a final position, means connecting the core and counter for indexing the latter upon movement of the core to its final position, means normally maintaining the core in its initial position, a latch member for holding the core in its final position, a latch-releasing solenoid operable upon energization thereof to release said latch member, a circuit for said indexing solenoid, a circuit for said latch-releasing solenoid, means controlled by rotation of said shaft for periodically closing the circuit of said indexing solenoid to move the core thereof to its final position and index the counter, means operable upon movement of said core to its final position to open the circuit of said indexing solenoid and means also operable upon rotation of said shaft for thereafter closing the circuit of said latch-releasing solenoid.

WARD LEATHERS.